V. V. CLARK.
PLACER MINING MACHINE.
APPLICATION FILED MAR. 25, 1916.
1,215,345.
Patented Feb. 13, 1917.
2 SHEETS—SHEET 1.
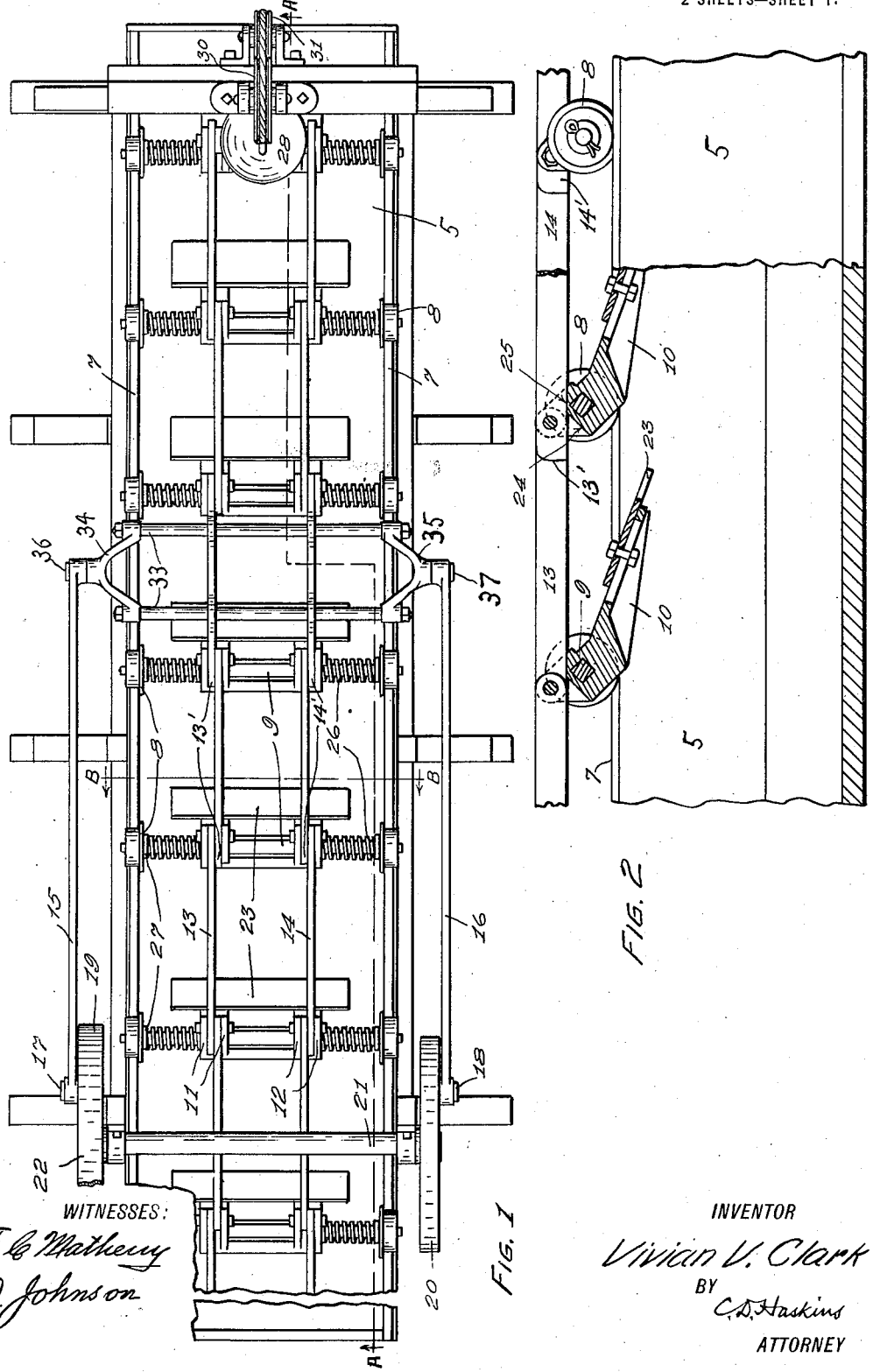
WITNESSES:
F. C. Matheny
O. Johnson
INVENTOR
Vivian V. Clark
BY
C. D. Haskins
ATTORNEY

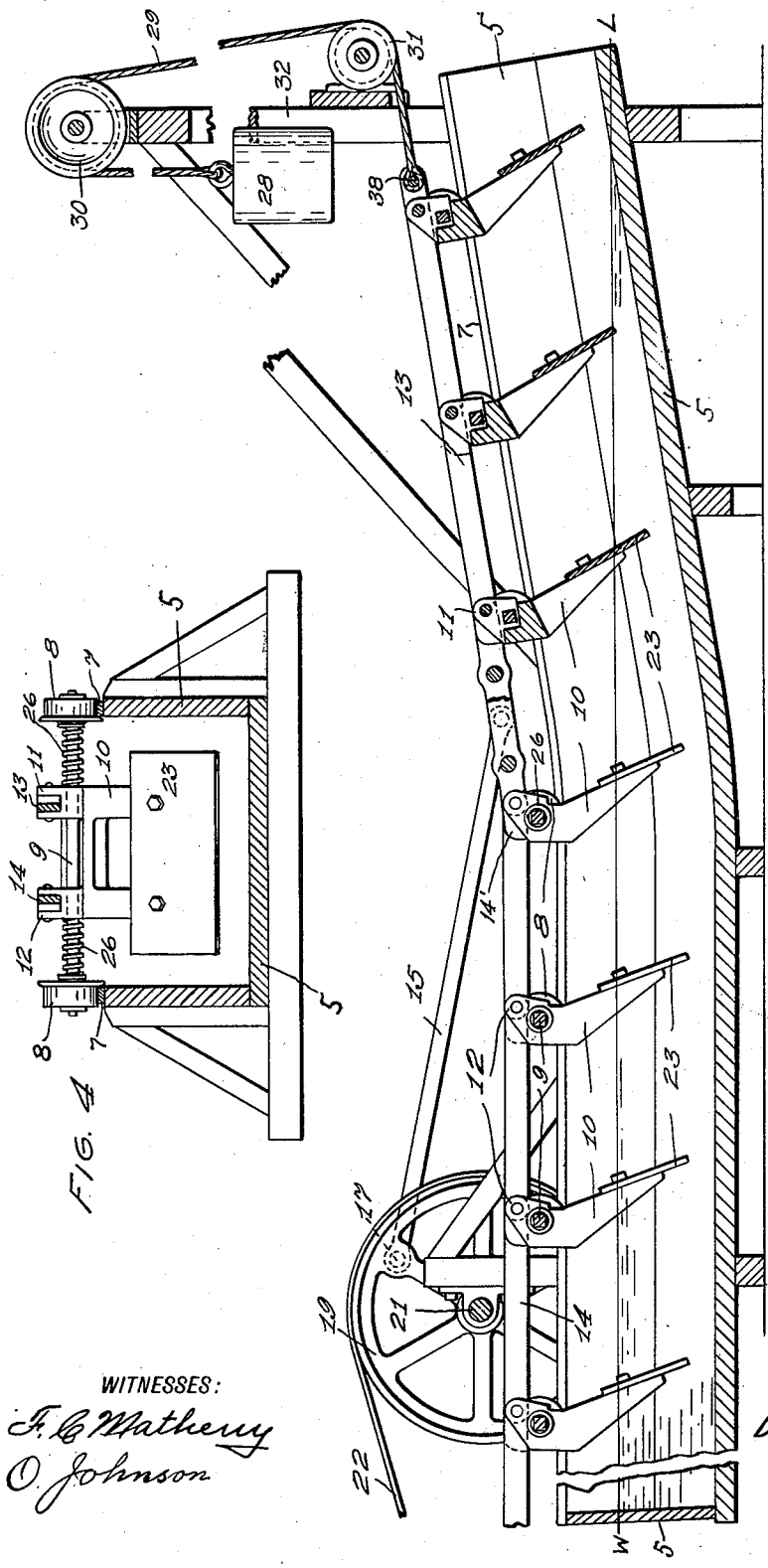

UNITED STATES PATENT OFFICE.

VIVIAN V. CLARK, OF TUCSON, ARIZONA.

PLACER-MINING MACHINE.

1,215,345.        Specification of Letters Patent.        Patented Feb. 13, 1917.

Application filed March 25, 1916. Serial No. 86,810.

*To all whom it may concern:*

Be it known that I, VIVIAN V. CLARK, citizen of the United States, residing at Tucson, in the county of Pima and State of Arizona, have invented a certain new and useful Improvement in Placer-Mining Machines, of which the following is a specification.

My invention relates to improvements in placer-mining machinery which is adapted for use in the operation of extracting gold and other precious metals from the metal bearing earthy material of placer mines, and more particularly it relates to improvements of my placer-mining apparatus which is illustrated and described in United States Letters Patent Number 1,011,321 granted to me on date of December 12th, 1911; and the object of my improvements is to provide a simple, durable and efficient machine that can be actuated by comparatively little power to operate on earthy matter, to separate and concentrate the gold and other heavy precious metals that may be associated therewith, irrespective of the presence in such earthy material of stone or fragments of rocks of such sizes and shapes as would obstruct and interfere with the operation of placer-mining apparatus like that described in my said United States Letters Patent Number 1,011,321, and a further object of my present invention is to provide a placer-mining machine that shall be adapted to operate efficiently upon a large quantity of such earthy matter while using only a very small quantity of water, the same water being used continuously except that quantity required to replace that portion that is lost by evaporation, absorption and seepage, whereby, for instance, a small pool of water formed by damming a small brook may serve to supply all the water necessary for efficient work.

I accomplish these objects by devices illustrated in the accompanying drawings wherein Figure 1 is a plan view of a placer-mining machine embodying my invention, Fig. 2 is an enlarged fragmentary view of the same, partly in vertical longitudinal section and partly in side elevation; Fig. 3 is a view of the same in longitudinal vertical section on broken line A, A of Fig. 1, and Fig. 4 is a view of the same in vertical cross-section on broken line B, B of Fig. 1.

Referring to the drawings, in which like reference numerals indicate like parts, 5 is a trough-like box which is curved to adapt it to project one of its end portions higher than the surface of a body of water therein when it is disposed, as more clearly shown in Fig. 3, with line W—L, representing such water, and such box 5 is provided with a trackway 7 disposed on the top edges of the side walls of said box 5 to extend throughout the length thereof, upon which trackway 7 may roll back and forth wheels 8 which are rotatably mounted on the ends of shafts 9 each of which shafts 9 carries a pusher or flight 10 that is mounted to be slidable endwise thereon and to project downwardly therefrom into the box 5, each of said flights 10 being provided with lugs 11 and 12 which project upwardly higher than its pivots, as more clearly shown in Fig. 4.

All the flights 10 are connected to form a chain-like structure by means of links 13 and 14 which extend between and pivotally connect the lugs 11 and 12 respectively of adjacent flights 10, whereby the flights 10 of such chain-like structure may be moved in unison to travel back and forth on said trackway 7.

At a point near the curved portion of the box 5 the links 13 and 14 of the chain-like structure are provided with two transverse rods 33 which rods 33 extend through said links 13 and 14 to project their ends outwardly on each side of the box 5 over the trackways 7 and their ends on each side of the chain-like structure are united by yokes 34 and 35 which are provided with projecting pivots 36 and 37 respectively such pivots 36 and 37 being articulated each with one end of connecting rods 15 and 16 whose other ends are connected respectively with crank pins 17 and 18 of the driving wheels 19 and 20 respectively, which driving wheels 19 and 20 are mounted on a shaft 21 to revolve therewith, said shaft 21 being supported by suitable bearings associated with the supporting frame of the box 5.

A belt 22, communicating with a source of power (not shown) is disposed to run on the periphery of the driving wheel 19 thus to communicate reciprocal movements to the flights 10 embodied in said chain-like structure through the medium of the crank-pins 17 and 18 and the connecting rods 15 and 16.

Each of the flights 10 is maintained normally in a lengthwise position on its respective shaft 9 that is equidistant from the ends thereof by means of helical compression springs 26 one of which is disposed to surround each of the end portions of such shaft 9 on each side of the flights 10 to extend between such flight 10 and the adjacent wheel 8 thus permitting such flight 10 during its travel to be forced to move sidewise in either direction on its shaft 9 when either side edge of such flight 10 is subjected to a sidewise pressure due to its engagement with a stone or other obstruction that may become interposed between it and a side wall of the box 5.

Each of the flights 10 is provided on its lower portion with a detachable blade 23 that is adapted to extend downwardly to engage with earthy material in the box 5 when the chain-like structure, of which such flights 10 form a part, moves forward in its reciprocal movements, and the transverse length and the depth of the blades 23, as shown in Fig. 4, are such that considerable space shall exist between the bottom edge of the blade and the bottom of the box 5 and between their ends and the side walls of said box 5, whereby a quantity of earthy material may settle in the bottom of the box 5 to remain undisturbed (there to serve as a substitution for riffle-bars of well known forms) to catch and retain particles of heavy metal, as gold, which by reason of their great weights may become separated from that portion of the metal bearing earthy material that is moved forward toward and through the inclined portion of the box 5 by the blades 23.

On each of the flights 10 is provided shoulders 24 that extend rearwardly in such position that they may engage each with the extended ends 13' and 14' of the links 13 and 14 when the chain-like structure is moving forwardly, such engagement serving to limit the backward swing of the flights 10 which backward swing is due to engagement of the blade 23 with the earthy matter to be moved forwardly by it.

To add to the force exerted through the medium of the connecting rods 15 and 16 to move the chain-like structure forwardly against the resistance of the earthy matter pushed forward thereby I have provided a heavy weight 28 suspended to a cord 29 which extends from such weight 28 upwardly over a pulley 30, pivotally mounted on the top of a suitable support 32, thence downwardly and under a pulley 31 thence to end of forward link 14'' by means of rod 38 to which it is connected, the pulley 31 being rotatably mounted on a bracket secured to said support 32. The action of such weight 28 is to assist in the operation of moving forwardly the chain-like structure with its load of material such weight 28 descending with each forward movement of the chain-like structure and being raised with each backward movement of such structure but when such weight 28 is raised by such backward movement of the chain-like structure such backward movement thereof is not resisted by any of the earthy material within the box 5 since in such backward movement the flights 10 swing upwardly to ride over the top of such earthy material, thus while the chain-like structure is being moved backwardly with no load, power exerted through the medium of connecting rods 15 and 16 may be stored in the rising weight 28 to be used in assisting to move the chain-like structure in its succeeding forward movement.

In the operation of my placer-mining machine herein shown and described the structure is set on a firm foundation and water introduced from an available supply so that the water line in box 5 will be near the upper edges of the blades 23 in the horizontal portion of the box while the bottom of the upwardly extended forward end of the box is above the surface of the water, as indicated by the line W—L in Fig. 3, which Fig. 3 shows the horizontal end portion of the box broken away for convenience of illustration but such horizontal portion may extend to any desired length to make it convenient for introducing earthy material into the back part of the horizontal portion of such box 5 by one of the well known ways of introducing earthy material into sluice boxes.

When power is communicated to the wheels 19 and 20 to rotate them the connecting rods 15 and 16 serve to communicate reciprocal movements to the chain-like structure embodying the flights 10 and blades 23 and as such reciprocal movements continue the metal bearing earthy material is deposited or shoveled into the rear end portion of the box 5 to mix with the water therein and such portions of the material as engage with a blade 23, when such blade 23 is nearest to a vertical position, will be moved forward by the forward movement of said blade 23 to a position where it may be engaged by the next blade 23 in front of it, and when the chain-like structure moves backwardly such blade 23 swings upwardly and is dragged backwardly over the top of the material that it had carried in its forward movement and when the chain-like structure makes its next forward movement such next blade 23 in front engages such material to carry it to a point where it can be engaged by another blade 23 to move it forward by the next succeeding forward movement of the chain-like structure in an obvious manner.

Thus, portions of the earthy material are successively carried from one blade 23 to another throughout the length of the box 5 to be ejected from its higher front end and when so ejected the material may be removed by shovels, scrapers or a mechanical conveyer in any well known manner.

By reason of the space between the side walls of the box 5 and the ends of the blades 23 and between the bottom of the box 5 and the bottom of the blade 23, a quantity of the heavier pieces of the earthy material as fragments of rock and stones will remain undisturbed within such space to rest on the bottom of box 5 where it will serve as riffles to hold the particles of precious metals, as gold, which sink into such stationary material as such particles separate and fall from the agitated mixture of earth and water that is being moved through the length of the box 5.

During the passage of the auriferous earthy matter through the box 5 it is so thoroughly mixed with the water and agitated that all particles of gold will settle in the bottom of the box 5 mostly along the horizontal portion thereof, very little being deposited in the lower part of the inclined front end portion of such box 5, and I have found in practical operations that no considerable portion of the gold contained in the material operated upon is ever ejected from the front end of the box 5.

During the reciprocal movements of the chain-like structure if it happens that a rock of any shape becomes interposed or wedged between one end of the blade 23 and a side wall of box 5 then such blade 23 is forced to move endwise on its shaft thereby freeing itself from interruption of its movement and moreover, if a large fragment of a rock gets stuck momentarily beneath one of the blades 23 then such blade in its forward movement will be forced upwardly to lift the wheels 8 from the trackway 7 and thus ride over the obstruction.

The chain-like structure, thus disposed within a box 5 whose side walls and bottom are separated by a wide space from the edges of the blades 23 of such chain-like structure, is adapted to operate free from interruptions by obstructions, like rocks and stones, which rocks and stones cannot get wedged between any portion of the box 5 and the blades 23, moreover, the earthy material in the bottom of the box 5 which remains undisturbed serves perfectly as riffles to engage and hold particles of metal which lodge thereon.

Manifestly the box 5 may be of any length and its upwardly turned front end portion may be extended to reach any height or forward distance and the surface of the body of water within which the box 5 is disposed may, if desired, be even with the top of the side walls of its horizontal portion.

Obviously numerous changes may be made in the form and arrangement of parts of my device without departing from the spirit of my invention or sacrificing any of its advantages.

What I claim is:—

1. In a placer-mining machine of the class described, the combination with a concentrating trough comprising a bottom member, and side walls, of a plurality of pairs of truck-wheels; and truck-axles disposed to adapt the wheels to travel back and forth on the top edges of the side walls of said trough-like box; a plurality of flights each mounted on a different one of said truck-axles and adapted to be slidably moved endwise thereon and further adapted to swing upwardly thereon from a substantially vertical position; a helical compression spring disposed to surround each end portion of said truck-axle between the flight thereon and a respective truck-wheel thereon; upwardly projecting lugs provided on each of said flights; links extending between the lugs of each of the adjacent ones of said flights and articulated therewith to form a chain-like structure comprising all of said truck-axles, truck-wheels, flights and links, whereby all such parts of said chain-like structure may be moved back and forth in unison; means of communicating backward and forward movements to said chain-like structure; and a plurality of blades each secured to a different one of said flights, said blades being of such dimensions that when said flights are in a substantially vertical position then there shall be a substantial space between them and the bottom and side walls of said trough-like box.

2. In a placer-mining machine of the class described, the combination with a concentrating trough having one end higher than its other end; of a chain-like structure embodying swingingly mounted and transversely sliding flights to adapt it to serve as a conveyer of earthy material, the said flights being cushioned during transverse sliding movement, said chain-like structure being provided with trucks which are disposed to travel on the top edges of the side walls of said concentrating trough; means for communicating back and forth movements to said chain-like structure; and mechanism embodying a cable, pulleys and a weight so associated and connected with said chain-like structure that such mechanism shall assist a forward movement of said chain-like structure and offer resistance to the backward movement thereof.

3. In combination with a concentrating trough having a bottom provided with an inclined portion, and side walls, an agitating conveyer operable in said trough comprising a plurality of longitudinally spaced transverse supports, flights pivotally and transversely movably mounted upon said supports and extending part way across the trough, opposing yieldable resilient means attached to each of the supports and bearing against the flight carried by such support and adapted to permit a lateral yield of the flight on encountering an obstruction, and means for reciprocating the supports and their flights longitudinally of the trough.

4. In combination with a concentrating trough having a bottom provided with an inclined portion, an agitating conveyer operable in said trough comprising a plurality of longitudinally spaced transverse supports, flights loosely mounted on said supports, means associated with said supports and flights whereby the flights are resiliently shiftable in transverse directions, and means for reciprocating the conveyer.

5. In combination with a concentrating trough, an agitating conveyer operable in said trough comprising a plurality of longitudinally spaced transverse supports, flights loosely mounted on said supports, means associated with said supports and flights whereby the flights are resiliently shiftable in transverse directions, and means for reciprocating the conveyer.

6. In combination with a concentrating trough, transverse shafts having wheels mounted on the ends thereof and riding on the upper edges of the trough, connecting means between the shafts, flights pivotally mounted on the shafts and capable of transverse movement, cushion means interposed between the opposite sides of the flights and wheels, and means for reciprocating the flights.

7. In combination with a concentrating trough, an agitating conveyer reciprocable therein, the said conveyer including pivotal and resiliently mounted transversely shiftable flights, and means for reciprocating the conveyer.

8. In combination with a concentrating trough, an agitating conveyer reciprocable therein, the said conveyer including pivotally mounted flights, the said flights being capable of transverse movement, resilient means for centering the flights and cushioning the transverse movement thereof, and means for reciprocating the conveyer.

9. In combination with a concentrating trough, an agitating conveyer reciprocable therein, the said conveyer including pivotal and transversely resiliently mounted self-centered flights, whereby the flights are permitted to move transversely when engaged by obstructions in the trough, and means for reciprocating the conveyer.

In witness whereof I hereunto subscribe my name this 7th day of March, A. D. 1916.

VIVIAN V. CLARK.

Witnesses:
M. F. Shaw,
Lillie Thomas.